(12) United States Patent  
Kato (10) Patent No.: US 6,717,055 B2
(45) Date of Patent: Apr. 6, 2004

(54) HARNESS FIXING DEVICE (75) Inventor: Mitsunobu Kato, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/373,051

(22) Filed: Feb. 26, 2003

(65) Prior Publication Data

US 2003/0183413 A1 Oct. 2, 2003

(30) Foreign Application Priority Data

Mar. 27, 2002 (JP) ........................................ 2002-087660

(51) Int. Cl.⁷ ................................................ H02G 3/04
(52) U.S. Cl. ..................... 174/72 A; 248/71; 248/73; 248/74.1; 173/136
(58) Field of Search .................... 174/71 R, 72 A, 174/72 C, 72 R, 96–98, 99 R, 101, 136, 40 CC, 65 R, 74 R; 138/106, 108, 113, 121, 135, 162, 173; 248/56, 71, 73, 74.1, 74.3

(56) References Cited

U.S. PATENT DOCUMENTS

| 3,711,632 A | * | 1/1973 | Ghirardi .................... 174/135 |
| 4,829,145 A | * | 5/1989 | Mitchell et al. ........... 174/65 G |
| 4,882,561 A | * | 11/1989 | Fujioka ....................... 336/65 |
| 4,919,462 A | * | 4/1990 | Matsui et al. ............. 285/149.1 |
| 5,023,959 A | * | 6/1991 | Mercer ....................... 138/109 |
| 5,390,876 A | * | 2/1995 | Hatano et al. ............. 248/74.1 |
| 6,085,795 A | * | 7/2000 | Ogawa et al. .............. 138/108 |
| 6,248,952 B1 | * | 6/2001 | Reeves et al. ............ 174/65 R |
| 6,294,736 B1 | * | 9/2001 | Takeda et al. ............ 174/72 A |
| 6,376,777 B1 | * | 4/2002 | Ito et al. .................. 174/152 G |
| 6,494,523 B2 | * | 12/2002 | Kobayashi .................. 296/155 |

* cited by examiner

Primary Examiner—Dean A. Reichard
Assistant Examiner—Adolfo Nino
(74) Attorney, Agent, or Firm—Armstrong, Kratz, Quintos, Hanson & Brooks (57) ABSTRACT The harness fixing device comprises: a rotatable member for holding a wiring harness; and a fixing device body for holding the rotatable member rotatably in the circumferential direction, wherein the rotatable member is provided with a harness guiding wall having a curved shape and the harness guiding wall is rotatable integrally with the wiring harness. The rotatable member is movable in the longitudinal direction of the harness in the fixing device body simultaneously with the rotation. The harness guiding wall is formed over the whole circumference of the rotatable member. An inner surface of the harness guiding wall is flush with an inner surface for holding the harness of the rotatable member. The rotatable member has a portion for holding a corrugated tube of the wiring harness.

9 Claims, 6 Drawing Sheets

HARNESS FIXING DEVICE

BACKGROUND OF THE INVENTION (1) Field of the Invention

The present invention relates to an improvement on a harness fixing device for holding a wiring harness rotatably in the circumferential direction on a vehicle body or slide door of a motor vehicle.

(2) Description of the Related Art

Figure 8:
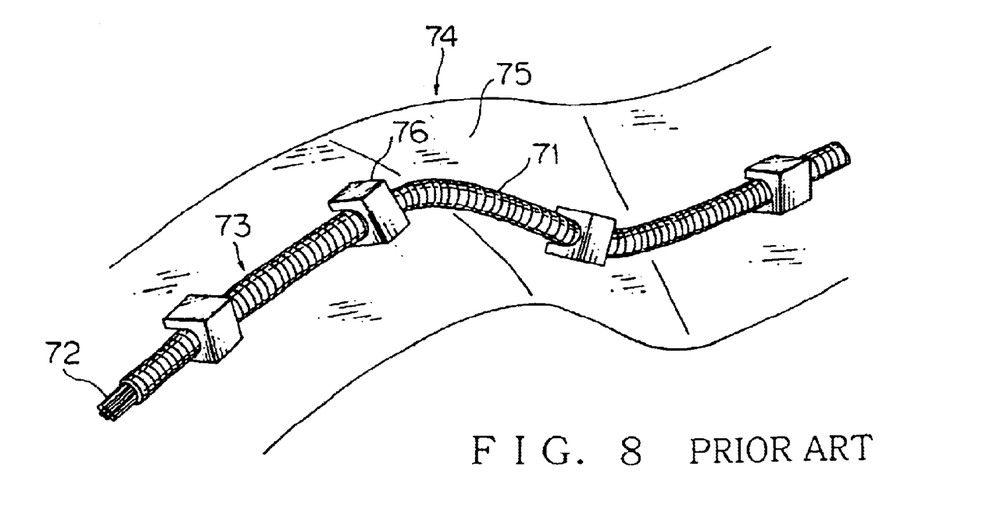
FIG. 8 is a perspective view illustrating an example of usage of a conventional harness fixing device.

FIG. 8 is a perspective view illustrating an example of usage of a conventional harness fixing device.

A harness fixing device 76 fixes a wiring harness 73 on a vehicle body or the like. A plurality of electric wires 72 are covered with a corrugated tube 71, thereby the wiring harness 73 is constructed. The corrugated tube 71 is made of synthetic resin and formed in a thin cylindrical shape, in which a concave groove and convex strip, each extending in a circumferential direction, are alternately arranged in parallel with a constant pitch in the longitudinal direction of the tube. The corrugated tube 71 is flexible.

The corrugated tube 71 functions as a tube for protecting wires and easily bends together with a plurality of wires 72 according to a panel 75 curved into a two or three dimensional shape of a mounting side 74 of a vehicle body or the like, thereby improving a feasibility of arrangement of the wiring harness 73.

The corrugated tube 71 may or may not have a slit in the longitudinal direction. As for the corrugated tube 71 having a slit, the wires 72 can be easily inserted inside the corrugated tube 71 from the slit. As for the corrugated tube 71 having no slit, the insertion work of the wires 72 into the corrugated tube 71 is time-consuming, however on the other hand, there is no possibility of the slit opening and there is no need of wrapping up with a vinyl tape to prevent the slit from opening.

For example, the harness fixing device 76 is constituted as a clamp for pressing the corrugated tube 71 onto the panel 75 of the mounting side 74. The harness fixing device 76 is invariably arranged at least at the bending portion of the mounting side 74 of a vehicle body or the like. A bundling tool such as a band can be used as the harness fixing device.

The harness fixing device 76 is fixed on the panel 75 of the mounting side 74 with a flexible locking clip or machine screw. The locking clip (not shown in the figure) has a pair of flexible locking pieces and is inserted into and locked by a hole of the panel 75. When a machine screw (not shown) is used, the machine screw is inserted into a hole of a bracket of the harness fixing device 76 and screwed into a tapped hole of the panel 75, thereby the harness fixing device 76 is fixed on the panel 75.

The wiring harness 73 is arranged along a curved surface of the mounting side 74 of a vehicle body or the like and the outside corrugated tube 71 is firmly fixed to the mounting side 74 with a plurality of harness fixing devices 76 arranged in the longitudinal direction of the tube. Thereby, the wiring harness 73 is firmly fixed to the mounting side 74 and for example, the shake due to the vibration upon traveling of a vehicle or the interaction between a vehicle body (the mounting side 74) and the wiring harness 73 and the noise due to the interaction can be prevented from occurring.

The wires 72 in the corrugated tube 71 are protected from rainwater and dust by the corrugated tube 71. The wires 72 are extended up to a specific portion such as an instrument panel, floor and door (hinge-type or slide-type door) along a vehicle body (74) and connected to the electric equipment or auxiliary through a connector.

However, as for a conventional harness fixing device 76 described above, when the corrugated tube 71 is firmly fixed with the harness fixing device 76 in order to fix the wiring harness 73 to the bending position of the mounting side 74 having a three-dimensional shape of a vehicle body or the like, the wires 72 and corrugated tube 71 are bent and twisted. This twist stress affects the corrugated tube 71, causing a problem of the deformation or damage of the corrugated tube 71 or a problem of the opening of the slit. When the slit is opened, the inside wires 72 might stick out outside and might be trodden on by a foot, and water or dust might enter inside from the opening.

Further, since the corrugated tube 71 receives a tensile force, the corrugated tube 71 rubs against an end portion of the harness fixing device, possibly causing wear or damage. When the wiring harness 73 is bent on a large scale to be arranged or the wiring harness 73 is shaken on a large scale having the harness fixing device 76 as a fulcrum, the wiring harness 73 including the corrugated tube 71 easily be bent or rubbed at the opening portion from which the corrugated tube 71 is guided out, causing possible damage of the corrugated tube 71 or the inside wires 72.

In the above explanation, a corrugated tube is used as a tube for protection. Instead, for example, when a net-shaped tube made of synthetic resin or a vinyl tape is used as the tube for protection, the same problems as described above can be arisen.

SUMMARY OF THE INVENTION

It is therefore an objective of the present invention to solve the above problems and to provide a harness fixing device, by which the twist of the tube for protection and the rubbing or damage of the tube and wires can be securely prevented from occurring when the wiring harness is arranged to be fixed, bent or shaken.

In order to attain the above objective, the present invention is to provide a harness fixing device comprising: a rotatable member for holding a wiring harness; and a fixing device body for holding the rotatable member rotatably in the circumferential direction, wherein the rotatable member is provided with a harness guiding wall having a curved shape and the harness guiding wall is rotatable integrally with the wiring harness.

With the construction described above, when the wiring harness is bent, the rotatable member rotates integrally with the wiring harness, thereby the harness guiding wall rotates integrally with the wiring harness. Consequently, no rubbing takes place between the harness guiding wall and wiring harness. The wiring harness bends in a curved shape along the harness guiding wall. The wiring harness is prevented from being excessively bent or receiving an excessive bending stress. The wiring harness is located inside the harness guiding wall and protected from the interaction with the outside. The wiring harness is prevented from being worn or damaged. Since the wiring harness rotates integrally with the rotatable member, the wiring harness is prevented from being twisted.

Preferably, the rotatable member is movable in the longitudinal direction of the harness in the fixing device body simultaneously with the rotation.

With the construction described above, the rotatable member moves in the longitudinal direction in the fixing device body in response to the bending or shaking of the wiring harness. When the rotatable member advances, the wiring harness protrudes forward long and curves on a large scale with a largely curved radius along the harness guiding wall. Consequently, the wiring harness is protected from an excessive bending stress and a sufficient gap with a vehicle body is secured, thereby preventing an interaction between the wiring harness and the outside such as a vehicle body or the like from occurring.

Preferably, the harness guiding wall is formed over the whole circumference of the rotatable member.

With the construction described above, even when the wiring harness is shaken or bent in any direction, the harness guiding wall always holds the wiring harness in a smoothly curved shape. Thereby, the wiring harness is securely prevented from being excessively bent or receiving an excessive bending stress.

Preferably, an inner surface of the harness guiding wall is flush with an inner surface for holding the harness of the rotatable member.

With the construction described above, the outer circumferential surface of the wiring harness uniformly comes in contact with from the inner surface for holding the harness of the rotatable member up to the inner surface of the harness guiding wall without any step or gap. Consequently, the wiring harness is bent in a smoothly curved shape without suffering from an excessive bending, thereby the wiring harness is securely prevented from being excessively bent or receiving an excessive bending stress.

Preferably, the rotatable member has a portion for holding a corrugated tube of the wiring harness.

With the construction described above, the corrugated tube situated at the outer circumferential side of the wiring harness is held immovably by the rotatable member and the wires in the corrugated tube are relatively freely rotatable in the corrugated tube, thereby the wires are protected from being excessively affected by the twisting force or bending force when the wiring harness is bent. Consequently, the wires are prevented from being damaged. The corrugated tube is bent in a curved shape along the harness guiding wall. Since the harness guiding wall rotates integrally with the rotatable member and the corrugated tube, the harness guiding wall is prevented from suffering from the twist with the corrugated tube, thereby the corrugated tube is prevented from being worn or damaged.

DESCRIPTION OF THE PREFERRED EMBODIMENTS

In the following, the preferred embodiments of the present invention will be explained with reference to the attached drawings.

Figure 1:
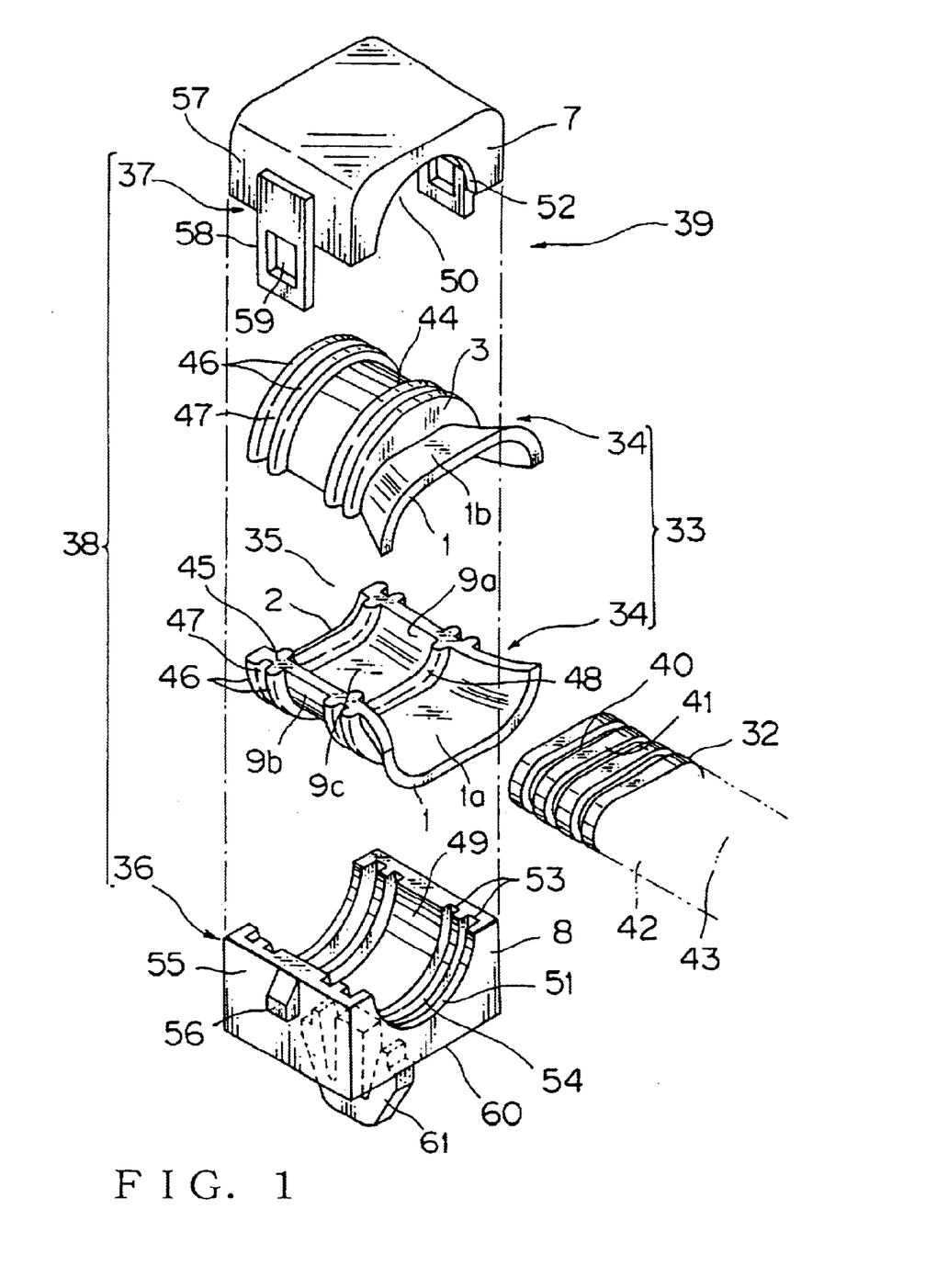
FIG. 1 is an exploded perspective view illustrating a first preferred embodiment of a harness fixing device according to the present invention.

FIG. 1 is an exploded perspective view illustrating a first preferred embodiment of a harness fixing device according to the present invention.

A harness fixing device 39 includes a rotatable member 33, which fixes a flat corrugated tube 32 having an elliptic shape in cross section with its inner diameter portion 35, and a fixing device body 38 for holding the rotatable member 33 rotatably in the circumferential direction and immovable in the longitudinal direction, which has a receiving part 36 and cap part 37, wherein the rotatable member 33 is integrally provided with a harness guiding wall 1 having a curved shape.

The corrugated tube 32 is made of synthetic resin and formed flat so as to effectively arrange a plurality of electric wires in a narrow space or gap of a vehicle body or the like. The corrugated tube 32 has concave grooves 40 and convex strips 41, each of which are alternately arranged in the longitudinal direction of the tube and has a long diameter portion 42 and short diameter portion 43 in the orthogonal direction to the longitudinal direction of the tube. A plurality of the wires and the corrugated tube 32 constitute a wiring harness.

The harness fixing device 39 according to this preferred embodiment corresponds to the flat corrugated tube 32. Instead, a harness fixing device may be one, which has a rotatable member (not shown in the figure) corresponding to a corrugated tube (not shown) having a circular shape in cross section. In this case, the circular corrugated tube is fixed in both axial and circumferential directions in the rotatable member.

The harness fixing device 39 made of synthetic resin includes the receiving part 36 at lower side, the cap part 37 at upper side, and the rotatable member 33, which is mounted rotatably between the receiving part 36 and the cap part 37 in a state that the rotatable member 33 holds the corrugated tube 32. The receiving part 36 and cap part 37 constitute the fixing device body 38. The rotatable member 33 is provided with a curved harness guiding wall 1 which is formed projectingly from a front end surface 3 of the rotatable member 33.

The rotatable member 33 is divided into the upper and lower members 34. When the two semicircular divided members 34 are joined together, an outer diameter portion 44 having a circular shape and an inner diameter portion 35 having an elliptic shape are formed, thereby each parting face 45 right and left is joined with its mating parting face closely.

Each divided member 34 is provided with a curved harness guiding wall 1 which is integrally formed projectingly from the front end surface 3 of the divided member 34. The harness guiding wall 1 extends in a bugle shape having an arc shape in cross section. The harness guiding wall 1 has a smoothly curved inner circumferential surface 1a. In this preferred embodiment, the harness guiding wall 1 has a thickness similar to that of the minimum thickness of the divided member 34 (that is, a thickness of the long diameter portion), the inner circumferential surface (i.e. harness holding inner surface) 9a of the long diameter portion is flush with the inner circumferential surface 1a of the harness guiding wall 1, and the outer circumferential surface 9b of the long diameter portion is flush with the outer circumferential surface 1b of the harness guiding wall 1. As for the short diameter portion, preferably, the inner circumferential surface 1a of the harness guiding wall 1 is flush with an inner circumferential surface (i.e. harness holding inner surface) 9c of the short diameter portion. The outer circumferential surface 1b of the harness guiding wall 1 is not necessarily flush with the outer circumferential surface 9b of the long diameter portion.

As a result, when a wiring harness is bent, the outer circumferential surface of the corrugated tube 32 is never rubbed with an edge of the rotatable member 33 since the harness guiding wall 1 is provided, thereby the corrugated tube 32 is protected from abrasion or damage. In FIG. 1, the opposite end of the divided member 34 is shown by its reference numeral 1.

In this preferred embodiment, the harness guiding wall 1 is closely formed in a ring shape for the whole circumference of the rotatable member 33 upon joining of the pair of divided members 34. Instead, if the corrugated tube 32 is bent in the short diameter direction, the harness guiding wall 1 can be formed in an arc shape only for the short diameter portion of the rotatable member 33 because the flat corrugated tube 32 can be easily bent in the short diameter direction. If the harness guiding wall is formed on the rotatable member in response to a corrugated tube (not shown) having a circular shape in cross section instead of a flat shape, such a harness guide wall is preferably formed closely in a ring shape for the whole circumference of the rotatable member.

As shown in FIG. 1, an outer circumference (i.e. outer diameter portion 44) of each divided member 34 is provided with a pair of half ring-shape strips 46 in front and rear of the divided member 34, which is projectingly formed in the circumferential direction and slidably fits to the receiving part 36 and cap part 37. In the pair of strips 46, one strip 46 is adjacent to another stripe 46 putting a circumferential groove 47 therebetween. The half ring-shaped strip 46 joins to the mating half ring-shaped strip 46 so as to form a ring shaped strip when the divided members 34 upper and lower join to each other. The pair of strips 46 in front and rear is formed in a rectangular shape in cross section having the same level with each other and an end of the strip 46 is formed smoothly without forming an edge. Only one pair of strips 46 for the divided member 34 may be provided instead of providing the pair of strips 46 in front and rear of the divided member 34 as described above.

As shown in FIG. 1, an inner circumference (i.e. inner diameter portion 35) of each divided member 34 is provided with a pair of half ellipse-shaped strips 48 in front and rear of the divided member 34, which is projectingly formed for fixing and fits to a concave groove 40 of a flat corrugated tube 32. The half ellipse-shaped strip 48 joins to the mating half ellipse-shaped strip 48 so as to form an ellipse-shaped strip when the divided members 34 upper and lower join to each other. A pitch of the strip 48 in front and rear is equal to a pitch of the concave groove 40 of the flat corrugated tube 32. The pitch of the concave groove 40 is uniform.

The inner diameter (long and short diameter) of the ellipse-shaped strip 48 obtained when the half ellipse-shaped strips 48 upper and lower join to each other is approximately equal to the outer diameter (long and short diameter) of the concave groove 40 of the flat corrugated tube 32. The width of each strip 48 is set a little smaller than the width of the concave groove 40 and the end of the strip 48 has a curved shape so as to smoothly fix the flat corrugated tube 32 without a backlash in any direction.

The strip 48 may be projectingly formed in a tapered shape having a mountain shape in cross section and the end thereof may be formed in a curved shape so that the engagement between the strip 48 and concave groove 40 can be carried out more smoothly. If the corrugated tube 32 having a circular shape in cross section (not shown) is employed, for example, preferably, the inner diameter of the strip 48 having an arc shape may be set a little smaller than the outer diameter of the concave groove 40 of the corrugated tube 32 so that the corrugated tube 32 can be fixed in the rotatable member 33 immovably.

The receiving part 36 and cap part 37 have respective receiving portions 49, 50 each having a half circular groove shape and respective half circular-shaped flanges 51, 52 having a diameter smaller than the inner diameter of the receiving portions 49, 50 outside the receiving portions 49, 50, that is, at the front and rear ends of the receiving part 36 and cap part 37, respectively, so that the receiving part 36 and cap part 37 can receive the rotatable member 33 inside the pair of the flanges 51 and 52 at front and rear rotatably in the circumferential direction.

The inner circumference of each receiving portion 49, 50 is provided with a slidable groove 53 for guiding the pair of strips 46 and a slidable strip 54 for guiding the circumferential groove 47 between the pair of strips 46 at front and rear. The depth of each slidable groove 53 is equal to or a little larger than the height of the slidable strip 54. The slidable strip 54 is necessary when the pair of strips 46 at front and rear is used for the rotatable member 33. When a pair of strips 46 are formed at front and rear, only a pair of slidable grooves 53 at front and rear is necessary on the inner circumferential surface of the receiving part 36 and cap part 37. The slidable groove 53 and slidable strip 54 of the cap part 37 side are not shown in FIG. 1.

Each slidable groove 53 comes in contact with the mating strip 46 leaving a little gap therebetween, thereby the rotatable member 33 can smoothly rotate in the circumferential direction between the receiving part 36 and cap part 37. The flange 51, 52 and the slidable strip 54 functions as a slidable support member to the rotatable member 33.

The pair of divided members 34 is not necessary to be locked with each other. When the cap part 37 is coupled with the receiving part 36, the receiving portions 49 and 50 join together forming a fully circular shape, then the pair of divided members 34 can rotate smoothly in the circumferential direction in the circular receiving parts in a state that the pair of divided members 34 fixes the flat corrugated tube 32 in its inner diameter portion 35. They may be fixed to each other by providing a positioning pin and its engaging hole on the parting face 45 of the divided member 34 or by providing the divided member 34 with a locking claw and its engaging hole.

A wall 55 situated right and left to the receiving part 36 is provided with a locking projection 56, while a wall 57 situated right and left to the cap part 37 is provided with a flexible locking frame piece 58 having an engaging hole 59, which engages with the locking projection 56. A bottom wall 60 of the receiving part 36 is provided with a locking clip 61, which engages with a panel of a mounting body such as a vehicle body. The locking clip 61 has a pair of flexible claws at an end of a support part.

A fixing means such as a bracket and bolt may be employed instead of the locking clip 61. The cap part 37 may be integrally joined with the receiving part 36 through a thin hinge (not shown), or alternatively the divided members 34 may be joined with each other openably through a thin hinge (not shown).

As for the assembly process of the harness fixing device 39, for example, after the divided members 34 situated upper and lower hold the corrugated tube 32 (at this time, the inner strip 48 of each divided member 34 engaging with the concave groove 40 of the corrugated tube 32), the rotatable member 33 consisting of the divided members 34 situated upper and lower is placed in the receiving part 36, then the cap part 37 is coupled with the receiving part 36. Thereby, the strip 46 engages with the slidable groove 53 slidably in the circumferential direction. Thereafter, the locking clip 61 is inserted into and engaged with a hole of a panel of a vehicle body or the like.

Alternatively, first, the locking clip 61 is inserted into and engaged with a hole of a panel of a vehicle body or the like, then the lower divided member 34 is placed in the receiving part 36 and then, the corrugated tube 32 is placed in the inner diameter portion 35 of the lower divided member 34 and then, the upper divided member 34 is placed on the corrugated tube 32 and finally, the cap part 37 is coupled with the receiving part 36.

In either case, the outer circumferential surface of the harness guiding wall 1 can smoothly rotate integrally with the rotatable member 33 without slidably coming in contact with each edge (i.e. flange 51, 52) of the receiving part 36 and cap part 37, respectively. In a state that the rotatable member 33 is mounted in the fixing device body 38, the harness guiding wall 1 protrudes long forward from the front end faces 7, 8 of the fixing device body 38 (see FIG. 2).

The rotatable member 33 may be held rotatably in the circumferential direction only by the flanges 51 and 52 situated at front and rear ends of the receiving part 36 and cap part 37, respectively, without the strips 46 on the outer circumference of the rotatable member 33. Alternatively, removing the flanges 51 and 52, the rotatable member 33 may be supported rotatably by the slidable groove 53 and/or the slidable strip 54.

The pair of divided members 34 may be joined with each other by using a hinge (not shown) (in this case, the pair of harness guiding walls 1 must not interfere with each other), or alternatively the rotatable member may be integrally formed in a ring shape (i.e. not in a divided shape), then the circumferential wall of the rotatable member (not shown) is provided with a pair of slit-shaped holes situated upper and lower, a support plate (not shown) instead of strip 48 is inserted into and engaged with the hole, and the end of the support plate is engaged with the concave groove 40, thereby fixing the corrugated tube 32 in the circular shaped inner circumferential portion of the rotatable member. In this case, the harness guiding wall 1 is formed at one end of the rotatable member.

When the harness fixing device 39 is fixed on a panel having a two or three dimensionally curved shape so as to arrange a wiring harness, even if a twist force is applied on the flat corrugated tube 32, the rotatable member 33, which holds the corrugated tube 32, rotates in the circumferential direction between the receiving part 36 and the cap part 37 so as to absorb the twist force. Therefore, the corrugated tube 32 is not affected by a twist force or bending force, the corrugated tube 32 is prevented from being deformed or damaged and the slit for inserting an electric wire is prevented from being opened, thereby the wiring harness can be smoothly arranged.

Figure 2:
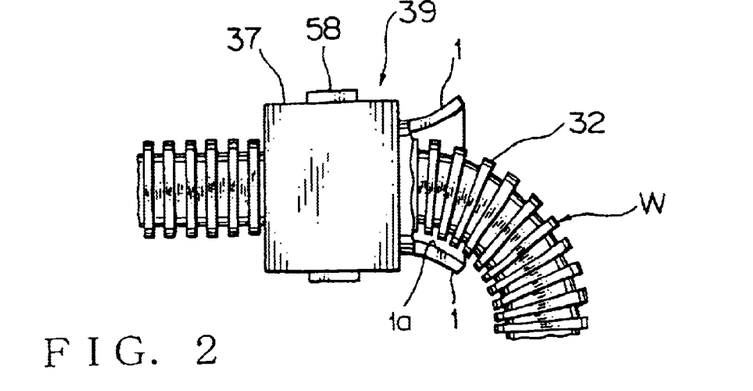
FIG. 2 is a plan view illustrating a state when a wiring harness is mounted into a harness fixing device by illustrating a part thereof with a cross section.

As shown in FIG. 2, when the wiring harness W bends or shakes on a large scale from the harness fixing device 39 with rotating in the circumferential direction, since the harness guiding wall 1 rotates integrally with the wiring harness W and the rotatable member 33 and makes the wiring harness W bend in a smoothly curved shape, the wiring harness W, i.e. the corrugated tube 32 does not rub against the harness guiding wall 1, thereby the wiring harness W is securely prevented from being worn or damaged.

Further, since the wiring harness W bends with a large radius along the harness guiding wall 1, the wiring harness W never suffers from extraordinarily excessive bend, thereby the wiring harness W is prevented from being deformed or damaged. Especially, since the outer circumferential surface of the wiring harness W closely comes in contact with the inner surface 1a of the harness guiding wall 1 for the whole length of the harness guiding wall 1, the wiring harness W bends smoothly in a finely curved shape along the harness guiding wall 1, thereby the wiring harness W is securely prevented from being extraordinarily excessively bent.

If the corrugated tube having a circular shape in cross section (not shown) is employed instead of the flat corrugated tube 32, the inner diameter portion 35 of the rotatable member 33 has a circular shape instead of a elliptic shape. The harness fixing device 39 rotatably supports the corrugated tube having a circular shape through the rotatable member 33, thereby the corrugated tube is prevented from being worn and the harness guiding wall 1 prevents the wear from occurring when the wiring harness is bent or shaken.

Figure 3:
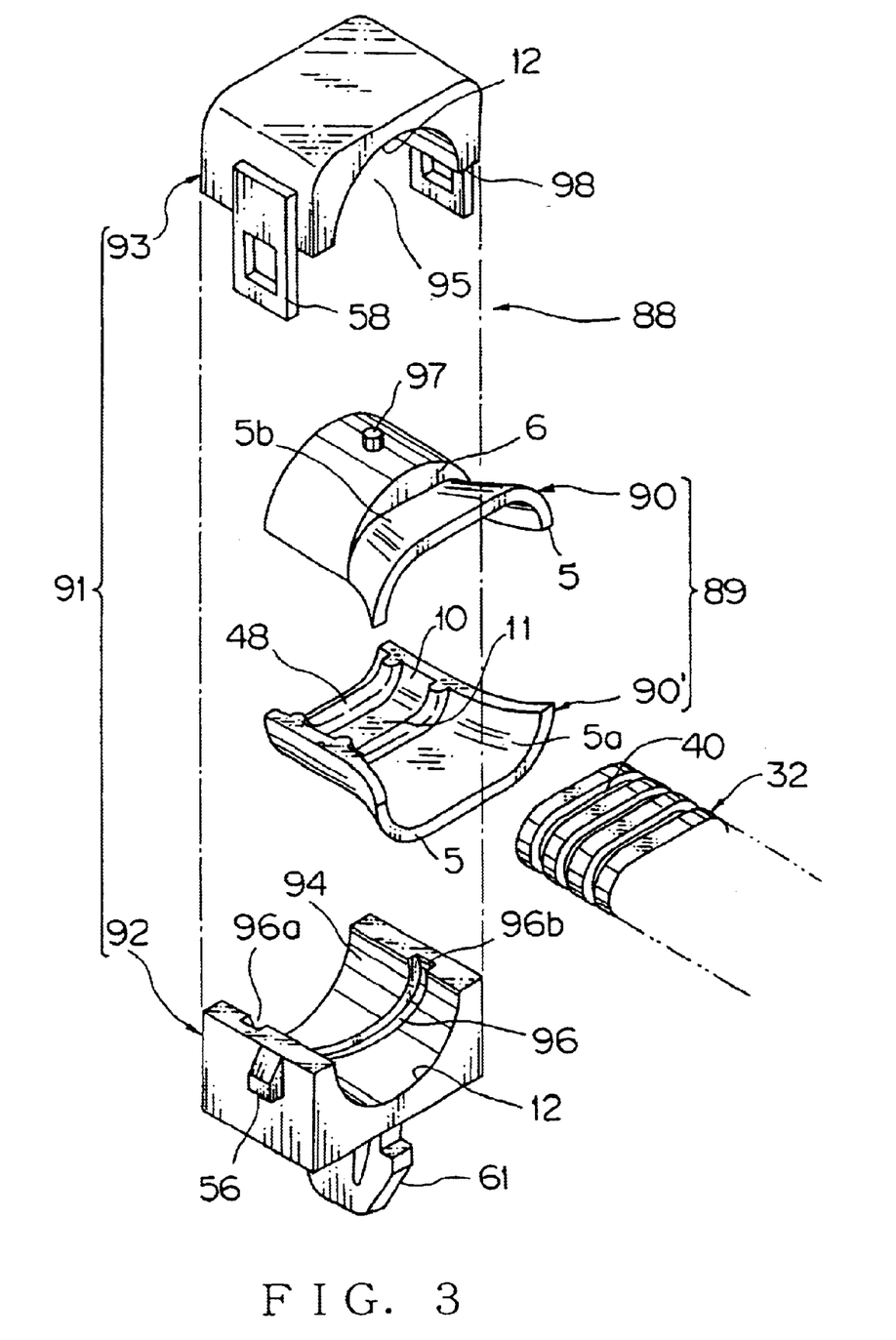
FIG. 3 is an exploded perspective view illustrating a second preferred embodiment of a harness fixing device according to the present invention.
Figure 4:
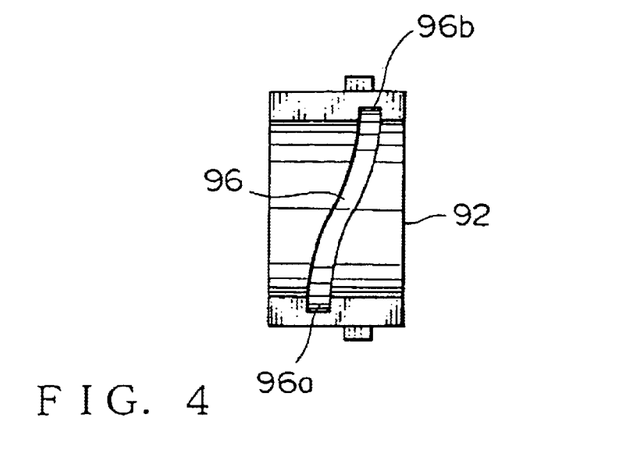
FIG. 4 is a plan view illustrating a receiving member of a harness fixing device.
Figure 5A:
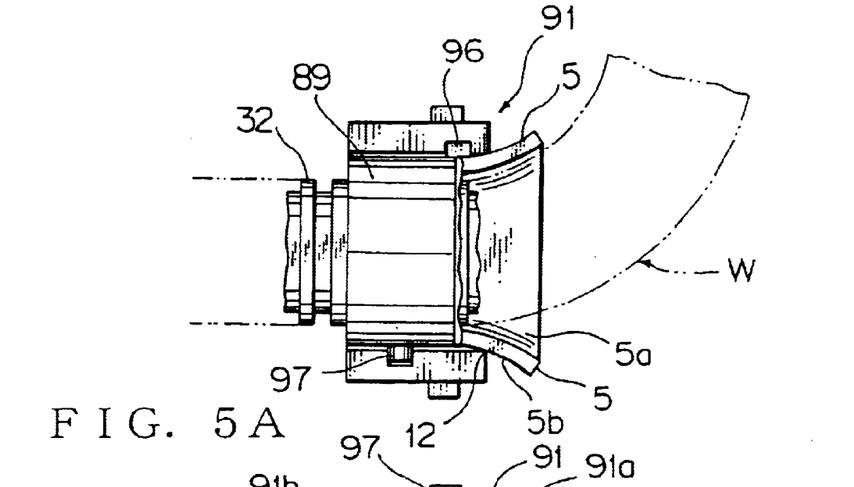
FIG. 5A is a cross sectional view illustrating a state when a wiring harness mounted into a harness fixing device is bent in one direction.
Figure 5B:
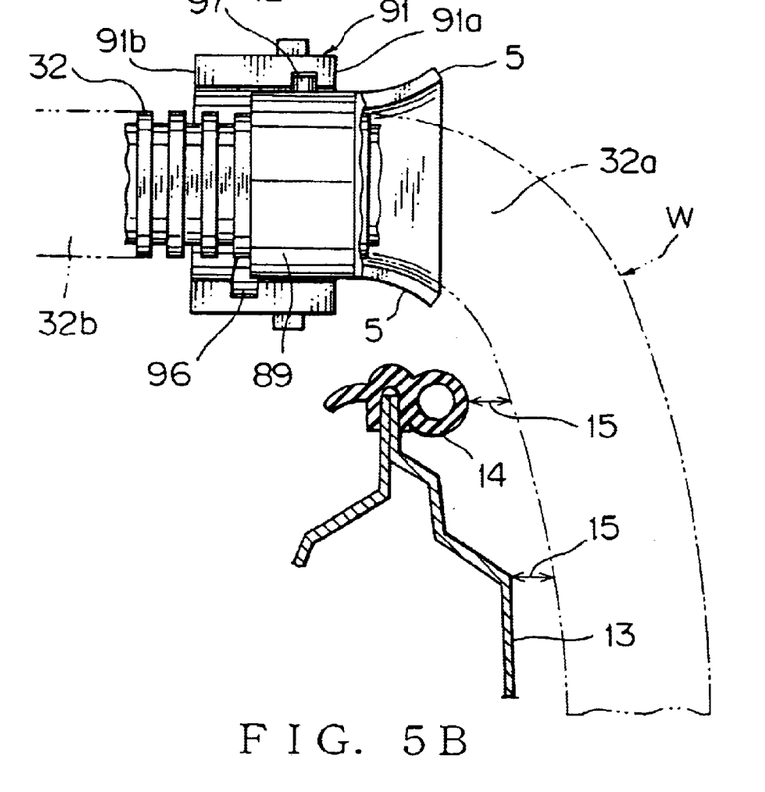
FIG. 5B is a cross sectional view illustrating a state when a wiring harness mounted into a harness fixing device is bent in another direction.

FIGS. 3–5 illustrate a second preferred embodiment of a harness fixing device according to the present invention.

In a harness fixing device 88, a rotatable member 89 having a harness guiding wall 5 rotates integrally as a flat corrugated tube 32 twists due to the bending of a wiring harness W, simultaneously the rotatable member 89 is made movable in the longitudinal direction of the corrugated tube 32 along a fixing device body 91, thereby preventing the corrugated tube 32 and wires (not shown) in the corrugated tube 32 from being pulled, and the length of the wiring harness W sticking out from the fixing device body 91 is set variable, thereby enlarging the bending radius of the wiring harness W, preventing the wiring harness W from being damaged, and smoothly bending the wiring harness W along the harness guiding wall 5, which rotates integrally with the rotatable member 89.

That is, each half circular-shaped receiving portion 94, 95, which is the inner diameter portion of a receiving part 92 and a cap part 93, respectively, is provided with a spiral-shaped cam groove 96 (only a cam groove of the receiving part 92 being shown in FIG. 3). The receiving part 92 and cap part 93 constitute the fixing device body 91. A projection 97, which slidably engages in the cam groove 96, is provided with one of a pair of divided members 90, 90' that constitute the ring-shaped rotatable member 89 supported rotatably in the receiving portions 94 and 95, thereby the rotatable member 89 is rotatable in the circumferential direction and movable in the axial direction along the fixing device body 91. Each divided member 90 is provided with a curved harness guiding wall 5 formed projectingly from the front end face 6 of the divided member 90.

The cam groove 96 has a rectangular shape in cross section and must be formed in at least one of the receiving part 92 and in the cap part 93. If the cam groove 96 is formed in both of the receiving part 92 and the cap part 93, one end 96a and the opposite end 96b of the cam groove 96 of the receiving part 92 communicate with the cam groove (not shown) of the cap part 93. FIG. 4 is a plan view of the receiving part 92 shown in FIG. 3. The cam groove of the cap part 93 has a start end and finish end, against which the projection 97 can abut. In this case, the corrugated tube 32 can rotate in the range of about 360°.

The shape of each cam groove 96 of the receiving part 92 and cap part 93 may be exchanged with each other, that is, the cam groove 96 of the receiving part 92 may be provided with the start and finish ends. Alternatively, the cam groove 96 may be formed only in the receiving part 92 so that a surface 98 of the cap part 93 is an abutting surface against the projection 97. In this case, the lower divided member 90' is provided with the projection 97 and the corrugated tube 32 can rotate in a range of 180°.

The projection 97 has a short cylindrical shape, has an outer circumferential surface having a smaller diameter than the inner width of the cam groove 96 and is disposed practically at the center of the outer circumferential surface of the divided member 90. Preferably, the projection is formed in one of the divided members 90 and 90', thereby attaining a large rotational angle. If each divided member 90, 90' has the projection 97, each projection 97 must be disposed being shifted in the longitudinal direction of the harness in response to the position of each cam groove 96 of the receiving part 92 and cap part 93, causing the rotational angle being reduced to about the half.

The harness guiding wall 5 is formed having an arc shape or an approximately arc shape in cross section, a base end of the harness guiding wall 5 approximately crosses the front end surface 6 of each divided member at right angles, and a front end inner surface 5a of the harness guiding wall 5 is enlarged having a diameter larger than an outer diameter of the rotatable member 89 at a long diameter portion 10 side of the rotatable member 89. The inner diameter portion of the rotatable member 89 has the long diameter portion 10 and a short diameter portion 11. The inner surface 5a of the harness guiding wall 5 is a smoothly curved surface. An outer surface 5b of the harness guiding wall 5 is a curved surface similarly to the inner surface 5a.

Since the corrugated tube 32 of the wiring harness W comes in contact with the inner surface 5a of the harness guiding wall 5, the inner surface 5a is smooth and the outer surface 5b has an optional shape provided that the outer surface 5b does not interfere with an edge 12 of the fixing device body 91. Preferably, the inner surface 5a of the harness guiding wall 5 is flush with an elliptic shaped inner circumferential surface (harness holding inner surface) of the rotatable member 89.

FIGS. 5A and 5B illustrate a state that the corrugated tube 32 rotates by 180°, in which the rotatable member 89 moves in the longitudinal direction of the corrugated tube 32 as the projection 97 slidably moves from one cam groove 96 to another corn groove 96. Thereby, in FIG. 5B, a portion 32a of the harness protruded from the front end 91a of the fixing device body 91 becomes longer while another portion 32b of the harness protruded from the rear end 91b of the fixing device body 91 becomes shorter. Thereby, the portion 32a is prevented from being pulled, the curve radius of the portion 32a becomes large due to the added length of the portion 32a, the portion 32a smoothly bends along the inner surface 5a of the harness guiding wall 5, which moves integrally with the rotating member 89, thereby preventing the corrugated tube 32 or above all the wires (not shown) received therein from being affected by undesired force and preventing the corrugated tube 32 and wires from being damaged.

Since the harness guiding wall 5 moves and rotates integrally with the rotatable member 89, the corrugated tube 32 moves and rotates integrally with the rotatable member 89, and the harness guiding wall 5 moves and rotates integrally with the corrugated tube 32, therefore the corrugated tube 32 never rubs against the harness guiding wall 5, thereby the corrugated tube 32 or the wiring harness W is securely prevented from being worn and damaged.

Moreover, since the harness guiding wall 5 is formed on the rotatable member 89 as an inner housing, therefore the outer circumferential surface of the wiring harness W closely comes in contact with the smooth curve-shaped inner surface 5a for the whole length of the harness guiding wall 5 and the wiring harness W finely bends along the smooth curve-shaped inner surface 5a. Therefore, the corrugated tube 32 and the wires therein are prevented from being affected by undesired force, thereby improving the lifetime (quality in terms of aging) of the wiring harness W.

As shown in FIG. 5B, the portion 32a protrudes forward long as the rotatable member 89 moves forward and the bending radius of the portion 32a increases, thereby making a gap 15 between the portion 32a and a vehicle body 13 or a waterproof sealing part 14, preventing the portion 32a from interfering with the vehicle body 13 or the waterproof sealing part 14, preventing the corrugated tube 32 or the wiring harness W from being worn and damaged, and preventing the noise from occurring.

As shown in FIG. 5A, the thickness of the harness guiding wall 5 and the length of the fixing device body 91 are determined so that the outer circumferential surface 5b of the harness guiding wall 5 does not interfere with the inner end 12 of the fixing device body 91 when the rotatable member 89 moves back. As shown in FIG. 5B, the harness guiding wall 5 protrudes largely from the front end 91a of the fixing device body 91 when the rotatable member 89 moves forward. When the rotatable member 89 moves back, the outer circumference of the corrugated tube 32 comes in contact with one side portion of the harness guiding wall 5 bending smoothly. When the rotatable member 89 moves forward, the outer circumference of the corrugated tube 32 comes in contact with another side portion of the harness guiding wall 5 bending smoothly. Thereby, the corrugated tube 32 or the wiring harness W is prevented from being excessively bent and damaged.

If, for example, the harness fixing device 88 is disposed at a vehicle body-side of the vehicle and the portion 32a of the harness is arranged from the vehicle body to the slide door-side, FIG. 5A is regarded as illustrating a state upon the slide door being fully opened, while FIG. 5B is regarded as illustrating a state upon the slide door being fully closed.

When the slide door is fully opened, the portion 32a slackens smoothly bending along one side portion of the harness guiding wall 5, while when the slide door is fully closed, the portion 32a is pulled in the closing direction of the slide door. However, since the portion 32a is extended toward the slide door rotating integrally with the rotatable member 89, therefore the pulling force is weakened, the portion 32a bends finely with a large bending radius along said another side portion of the harness guiding wall 5 from the fixing device body 91, thereby securing the gap 15 between the portion 32a and the vehicle body 13, preventing the interference with the vehicle body 13, preventing the portion 32a from being damaged, and preventing the waterproof sealing part 14 from being damaged.

In FIG. 3, a surface of each receiving portion 94, 95 of the receiving part 92 and cap part 93 and a surface of the outer diameter portion of the rotatable member 89 are smoothly formed without unevenness except for the cam groove 96 and the projection 97, allowing the rotatable member 89 to rotate smoothly. The inner diameter portion of the rotatable member 89 is provided with a protruding strip 48, which engages with the concave groove 40 of the corrugated tube 32. In FIG. 3, there are shown a locking frame piece 58, locking projection 56 and locking clip 61.

In FIG. 3, the rotatable member 89 has the ellipse-shaped inner diameter portion in response to the flat corrugated tube 32, instead a rotatable member having a circular shaped inner diameter portion may be employed in response to a circular shaped corrugated tube (not shown). In this case, the circular shaped inner diameter portion is set equal to or less than the outer diameter of the corrugated tube and the corrugated tube is fixed with the inner diameter portion so as not to be movable in the circumferential direction. A ring-shaped harness guiding wall curved in an arc shape or approximately arc shape in cross section is protrudingly formed integrally on the front end surface of the rotatable member, which has a circular shaped inner diameter portion. Preferably, the inner surface of the harness guiding wall is flush with the inner surface of the inner diameter portion of the rotatable member. The harness guiding wall may consist of a plurality of arc-shaped parts being divided in the circumferential direction, instead of one continuously formed having a ring shape as described above.

The projection 97 may be formed in the fixing device body 91 instead of the rotatable member 89, while the come groove 96 may be formed on the outer circumferential portion of the rotatable member 89 instead of the fixing device body 91.

Figure 6:
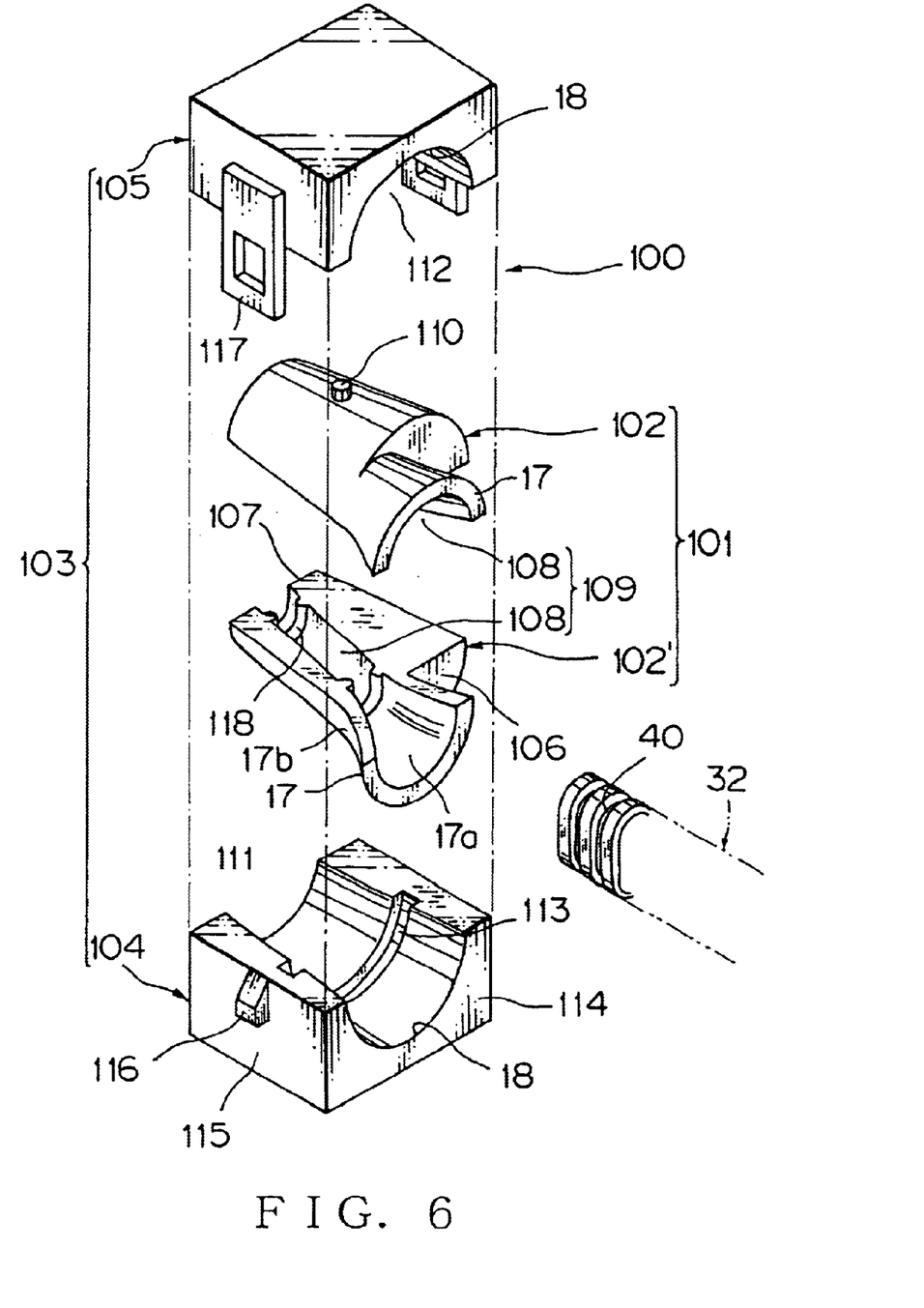
FIG. 6 is an exploded perspective view illustrating a third preferred embodiment of a harness fixing device according to the present invention.
Figure 7A:
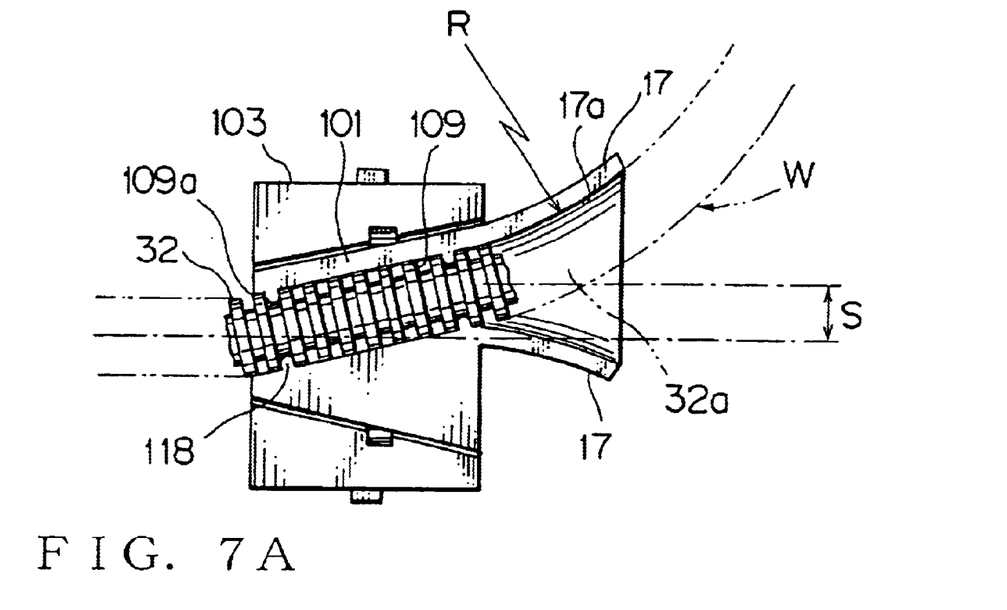
FIG. 7A is a cross sectional view illustrating a state when a wiring harness mounted into a harness fixing device is bent in one direction.
Figure 7B:
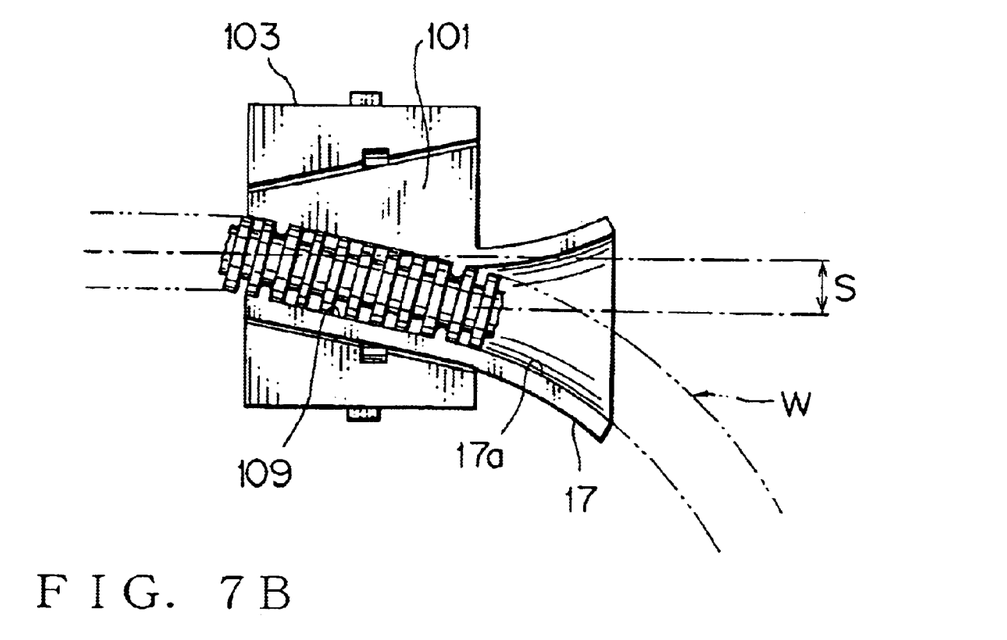
FIG. 7B is a cross sectional view illustrating a state when a wiring harness mounted into a harness fixing device is bent in another direction.

FIGS. 6 and 7 illustrate a third preferred embodiment of a harness fixing device according to the present invention.

In a harness fixing device 100, a rotatable member 101 having a harness guiding wall 17 holds a corrugated tube 32, which is eccentric in an oblique direction. When the rotatable member 101 rotates inside a fixing device body 103, a portion 32a of a harness (see FIG. 7) coming out from the rotatable member 101 is allowed to bend with a large bending radius along the harness guiding wall 17, thereby preventing the corrugated tube 32 and inside wires (not shown) from excessively being bent, worn and damaged.

As shown in FIG. 6, the rotatable member 101 consisting of a pair of the divided members 102 and 102' is formed in a tapered shape. A front end surface 106 of the rotatable member 101 is formed to have a large diameter, while a rear end surface 107 of the rotatable member 101 is formed to have a small diameter. Each end surface 106, 107 has a circular shape. A harness holding groove 108, i.e. the inner diameter portion, is formed straightly from the center of the rear end surface 107 up to the front end surface 106 situated near to the outer diameter portion, and a pair of the harness holding grooves 108 is coupled with each other, thereby forming a elliptic harness holding hole 109 (i.e. the inner diameter portion), in which the flat corrugated tube 32 fits.

The bugle-shaped harness guiding wall 17 curved in an arc or approximately arc shape in cross section is protrudingly formed integrally with the front end surface 106 of the rotatable member 101 along an opening edge of the harness holding hole 109. The harness guiding wall 17 is formed in each divided member 102, 102'. When the divided member 102 is joined to the other divided member 102', they form a continuous elliptic shape in cross section without a gap. Preferably, an inner circumferential surface 17a of the harness guiding wall 17 is flush with an inner circumferential surface (harness holding inner surface) of the harness holding groove 108. An outer circumferential surface 17b situated at the base end side of the harness guiding wall 17 must not protrude outward further than an outer circumferential surface of the divided member 102, 102' so that the outer circumferential surface 17b does not interfere with an edge 18 of the fixing device body 103.

The harness holding groove 108 according to the preferred embodiment as described above fits with the flat corrugated tube 32 having an elliptic shape in cross section. If a corrugated tube has a circular shape in cross section (not shown), a harness guiding groove having a half circular shape (not shown) is formed. In this case, a bugle shape harness guiding wall is formed in a ring shape (i.e. a circular shape in cross section) along an opening edge of a circular shaped harness holding hole formed by joining a pair of harness holding grooves, each having a half circular shape in cross section. In FIG. 6, the harness holding groove 108 is formed eccentric in an oblique direction relatively to the axis of the rotatable member 101 and extends in parallel with the outer circumferential surface of the divided member 102, 102'.

A pair of projecting strips 118, each of which fits in a concave groove 40 of the corrugated tube 32, is formed at front and rear in each harness holding groove 108 and the corrugated tube 32 is held immovably in the harness holding hole 109. If a corrugated tube has a circular shape, preferably the corrugated tube is held not rotatably in the circumferential direction in the rotatable member.

The outer circumferential portion of one or both of the divided members 102 and 102' is provided with a short cylindrical projection 110 for positioning and sliding, which fits with the fixing device body 103. In the preferred embodiment illustrated in FIG. 6, preferably both of the divided members 102 and 102' are provided with the short cylindrical projection 110 symmetrically from the viewpoint of stability.

The fixing device body 103 consists of a receiving part 104 and cap part 105. Each receiving portion 111, 112 at the inner diameter side of the receiving part 104 and cap part 105 is formed in a tapered groove shape in response to the shape of the rotatable member 101. An outer diameter of a taper shape hole portion formed upon the coupling between the receiving portions 111 and 112 is slightly larger than the outer diameter of the rotatable member 101 so that the rotatable member 101 is held rotatably in the circumferential direction in the hole portion. A smooth inner circumferential surface of each receiving portion 111, 112 is provided with a groove 113, in which the projection 110 fits, continuously in a ring shape. Here, a groove 113 may be an oblique or spiral cam groove 96 similarly to the preferred embodiment illustrated in FIG. 3 so that the rotatable member 101 can move in the axial direction. In this case, preferably the rotatable member 101 has not a taper shape but a cylindrical shape for preventing the looseness from occurring. The receiving part 104 has a locking projection 116 on both side walls 115 thereof, while the cap part 105 has a locking frame piece 117 on both side walls thereof.

The flat corrugated tube 32 is received and held immovably between the pair of divided members 102 and 102', that is in the rotatable member 101, and the rotatable member 101 is received between the receiving part 104 and the cap part 105 and held rotatably in the circumferential direction. The projection 110 slidably engages in the groove 113 for guiding, while the locking projection 116 engages with the locking frame piece 117. The harness guiding wall 17 protrudes in a bugle shape toward oblique front from the front end 114 of the fixing device body 103 and the outer circumferential surface 17b of the harness guiding wall 17 can smoothly rotate integrally with the rotatable member 101 without interfering with the front edge 18 of the fixing device body 103.

In such a state as described above, as shown in FIG. 7A, being affected by a twisting force, when a wiring harness W bends to the right, the rotatable member 101 rotates accordingly, the harness holding hole 109 is inclined into the bending direction of the harness, and the center of the front end of the harness holding hole 109 is situated being eccentric to the harness bending-side off from the center of the rear end with the length of eccentricity S. Thereby, the wiring harness W, that is, the corrugated tube 32 and the inside wires bend with a large curving radius R along one curved side portion of the harness guiding wall 17. This curving radius R of the wiring harness W is large compared to that in the case of the rotatable member 33 having the inner diameter portion 35 in the axial direction in the preferred embodiment as shown in FIG. 1, thereby reducing the bending stress, which affects the wiring harness W, and allowing the wiring harness W to bend more smoothly.

Upon bending, the wiring harness W comes in closely contact with the curved inner surface 17a for whole length of the harness guiding wall 17, thereby the wiring harness W smoothly bends without receiving an undesired stress affecting against the corrugated tube 32 and inside wires. When the corrugated tube 32 is flat, preferably the wiring harness W bends in the small diameter direction. Since the rotatable member 101 is formed in a taper shape along the harness holding hole 109, the rotatable member 101 can smoothly rotate in response to the twist of the wiring harness W, thereby the absorption of the twist of the wiring harness W is securely carried out.

In a state as illustrated in FIG. 7A, when the wiring harness W is affected by twist force in the inverse direction, the wiring harness W rotates by 180° integrally with the rotatable member 101 as shown in FIG. 7B, bends with a large bending radius with the length of eccentricity S similarly to FIG. 7A, and closely comes in contact with the inner surface of the other side of the harness guiding wall 17, thereby preventing the wiring harness W from being affected by an excessive bending force and securing the quality of the wiring harness W. Since the harness guiding wall 17 rotates integrally with the corrugated tube 32, rubbing between the corrugated tube 32 and the harness guiding wall 17 never takes place.

FIG. 7A is regarded as illustrating a state upon the slide door being fully opened, while FIG. 7B is regarded as illustrating a state upon the slide door being fully closed. When the slide door is opened, the wiring harness W is twisted being pulled in the opening direction, while when the slide door is closed, the wiring harness W is twisted being pulled in the closing direction. Upon opening or closing of the slide door, absorbing a twist by rotating in the circumferential direction, the wiring harness W smoothly bends with a large bending radius along the harness guiding wall 17, thereby preventing the wiring harness W from being damaged.

Instead, the rotatable member 101 may be provided with a groove 113 for guiding while the fixing device body 103 may be provided with a projection 110 for slide engaging. The rotatable member 101 may be formed in a cylindrical shape similarly to the case shown in FIG. 1 instead of the taper shape and only the harness holding hole 109 may be formed eccentric in an oblique direction. In this case, the receiving portion 111, 112 of the fixing device body 103 is formed to have a uniform inner diameter in accordance with the rotatable member 101. The harness guiding wall is formed integrally with an opening edge of the harness holding hole of the rotatable member.

Further, in each preferred embodiment, the harness guiding wall 1, 5, 17 may be formed not integrally with the rotatable member 33, 89, 101 and may be fixed to the rotatable member 33, 89, 101 instead. In such a case, the rotatable member 33, 89, 101 may be made of metal such as aluminum or ceramic besides synthetic resin. Normally, the harness guiding wall 1, 5, 17 is preferably molded integrally with the rotatable member 33, 89, 101 by using synthetic resin as its material.

Further, for example, a net-shaped protection tube made of synthetic resin may be employed instead of the corrugated tube 32. Alternatively, instead of employing the corrugated tube 32, a plurality of wires may be bundled up so as to construct a wiring harness W and the wiring harness W may be held with a rotatable member so as to be bent along a harness guiding wall of the rotatable member. In such cases, the protruding strip 48, 118 in the rotatable member may be removed, or alternatively a projection for holding a harness may be provided instead of the protruding strip 48, 118.

The aforementioned preferred embodiments are described to aid in understanding the present invention and variations may be made by one skilled in the art without departing from the spirit and scope of the present invention.

What is claimed is:

1. A harness fixing device comprising:
   a rotatable member for holding a wiring harness; and
   a fixing device body for holding the rotatable member rotatably in the circumferential direction,
   wherein the rotatable member is provided with a harness guiding wall having a curved shape and the harness guiding wall is rotatable integrally with the wiring harness.

2. The harness fixing device according to claim 1, wherein the rotatable member is movable in the longitudinal direction of the harness in the fixing device body simultaneously with the rotation.

3. The harness fixing device according to claim 2, wherein the harness guiding wall is formed over the whole circumference of the rotatable member.

4. The harness fixing device according to claim 3, wherein an inner surface of the harness guiding wall is flush with an inner surface of the rotatable member, said inner surface of the rotatable member holding the harness.

5. The harness fixing device according to claim 2, wherein an inner surface of the harness guiding wall is flush with an inner surface of the rotatable member, said inner surface of the rotatable member holding the harness.

6. The harness fixing device according to claim 1, wherein the harness guiding wall is formed over the whole circumference of the rotatable member.

7. The harness fixing device according to claim 6, wherein an inner surface of the harness guiding wall is flush with an inner surface of the rotatable member, said inner surface of the rotatable member holding the harness.

8. The harness fixing device according to claim 1, wherein an inner surface of the harness guiding wall is flush with an inner surface of the rotatable member, said inner surface of the rotatable member holding the harness.

9. The harness fixing device as claimed in any one of claims 1–4, wherein the rotatable member has a portion for holding a corrugated tube of the wiring harness.

* * * * *